April 2, 1957 — C. C. WILSON — 2,787,079
FISHING FLOAT OR BOBBER
Filed March 25, 1955
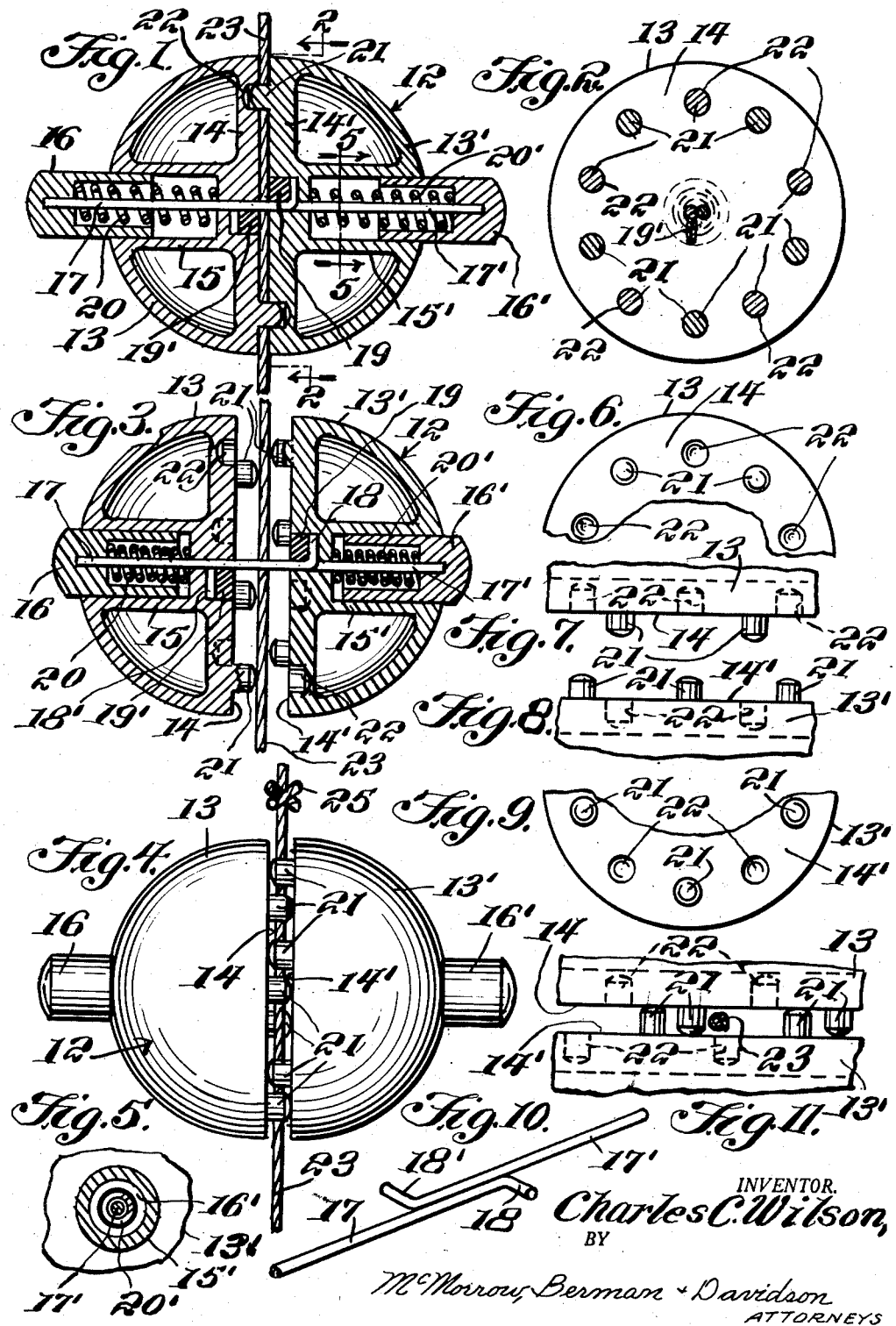

United States Patent Office 2,787,079
Patented Apr. 2, 1957

2,787,079

FISHING FLOAT OR BOBBER

Charles C. Wilson, Saginaw, Mich.

Application March 25, 1955, Serial No. 496,796

2 Claims. (Cl. 43—44.87)

This invention relates to fishing equipment, and more particularly to an improved fishing float.

A main object of the invention is to provide a novel and improved fishing float adapted to be used in casting or in other types of fishing, said float being provided with means for detachably clamping the float to the fishing line, so that the float may be readily secured to a desired portion of the line, the float being further arranged so that it may be adjusted for free running movement along the line.

A further object of the invention is to provide an improved fishing float of a type which may be adjustably secured to a fishing line or alternatively may be adjusted for free running movement along the line, said float being simple in construction, being easy to engage with a fishing line, and being easy to adjust in position along a fishing line or to adjust for free running movement along the line.

A still further object of the invention is to provide an improved adjustable float device for use with a fishing line, said device being inexpensive to manufacture, being sturdy in construction, and being relatively compact in size.

Further objects and advantages of the invention will become apparent from the following description and claims, and from the accompanying drawings, wherein:

Figure 1 is a vertical longitudinal cross sectional view taken through an improved fishing float according to the present invention and shown with the segments thereof in clamping engagement with a fishing line.

Figure 2 is a vertical cross sectional view taken on the line 2—2 of Figure 1.

Figure 3 is a vertical longitudinal cross sectional view, similar to Figure 1, showing the segments of the fishing float in separated positions, whereby the fishing line is free for removal, or whereby a fishing line may be inserted between the segments of the float device.

Figure 4 is a side elevational view of the float device of Figures 1 to 3, showing the segments of the float device adjusted to provide a space therebetween to allow the float device to run freely on the fishing line.

Figure 5 is a cross sectional detail view taken on the line 5—5 of Figure 1.

Figure 6 is a fragmentary plan detail view of a portion of the flat inside surface of one of the segments of the float device of Figures 1 to 5.

Figure 7 is an elevational view of the portion of the float segment of Figure 6.

Figure 8 is an elevational view of a portion of the other float segment which is adapted to mesh with the float segment of Figures 6 and 7.

Figure 9 is a plan view of the segment portion of Figure 8 showing the flat inside surface of said segment portion.

Figure 10 is a perspective view showing the fastening rod elements employed to connect the float segments together in the float device of Figures 1 to 9.

Figure 11 is a fragmentary enlarged side elevational view of the inside portions of the float segments in the adjusted positions thereof shown in Figure 4 and illustrating the manner in which the projections on the flat inside surfaces of the projections engage the opposite flat surfaces of the segments to provide a sufficient space between the segments to allow the fishing line to run freely therebetween.

Referring to the drawings, the improved float device is designated generally at 12 and comprises a pair of mating substantially hemispherical hollow segments 13, 13' of identical construction, said segments having the flat inside mating surfaces 14, 14'. The respective segments 13, 13' are formed with the respective cylindrical chambers 15, 15' on a common longitudinal axis perpendicular to the mating surfaces 14, 14' and arranged axially with respect to the segments 13, 13', as shown in Figures 1 and 3. Slidably disposed in the respective cylindrical chambers 15, 15' are the respective plunger elements 16 and 16' which are rotatable in the respective chambers 15, 15' and which project outwardly therefrom. Secured axially to the respective plungers 16 and 16' are the respective rod elements 17 and 17', said rod elements extending slidably through the associated float segments and being formed at their ends with hook portions 18 and 18' which are secured in the opposing float segments, as shown in Figures 1 and 3. Thus, the hook element 18 of the rod 17 is received in a recess in the inside face portion 14' of the segment 13' and is rigidly secured in said recess by a suitable block element 19 cemented in the recess, as shown. The hook element 18' of rod 17' is similarly secured in a recess provided in the float segment 13, as by the use of a block element 19' cemented in the recess.

The plunger elements 16 and 16' are hollow, as shown, and positioned in said plunger elements surrounding the respective rod elements 17 and 17' are the respective coiled springs 20 and 20' acting between the end walls of the plunger elements and the opposite portions of the associated segments to bias the plunger elements 16 and 16' outwardly with respect to their respective associated segments 13 and 13' and therefore to urge the mating surfaces 14 and 14' of the segments together.

Each of the flat surfaces 14 and 14' is formed with a plurality of spaced projections 21, said projections being located on a circle concentric with the longitudinal axis of the plungers 16, 16' and being spaced apart by equal distances. The faces 14 and 14' are formed between the projections 21 with recesses 22 located on the same circle as the projections 21 and spaced evenly between the projections, as shown in Figure 6. Each of the faces 14 and 14' is provided with an identical configuration of the projections 21 and recesses 22, whereby the recesses 22 of one of the faces will receive the projections 21 of the other face in the manner illustrated in Figure 1 to lock the segments 13 and 13' against relative rotation. In the position shown in Figure 1, the faces 14 and 14' are urged relatively closely together and clampingly engage a fishing line 23 disposed between the segments, whereby the float will be secured in a desired position along said fishing line. To release the line, the plunger elements 16, 16' are pushed inwardly, as by exerting finger pressure thereon, whereby the opposing forces exerted on the plungers are transmitted through the rods 17, 17' to the respective segments, forcing the segments apart. To hold the segments in separated positions, they may be rotated relative to each other, since the plunger elements 16 and 16' are rotatable in their cylindrical chambers 15 and 15', the segments being rotated relative to each other sufficiently so that when the plunger elements 16 and 16' are released, the projections 21 will engage the flat surface portions of the respective faces 14 and 14' instead of being received in the recesses 22. This may be done when it is desired to allow the float device to run freely with respect to the fishing line 23, as illustrated in Figure 4, such as for example, to allow free passage of a knot 25 in the line between the segments.

To insert the line 23 between the segments, or to remove the line therefrom, the segments are separated by exerting opposing pressures on the plungers 16 and 16', to cause the segments to be spread apart in the manner illustrated in Figure 3, whereby the line is freely insertable between the segments or removable therefrom. When the plunger elements are released, the springs 20 and 20' urge the segments together, and if the segments are arranged so that the projections 21 are in alignment with the opposing recesses 22, the faces 14 and 14' will be urged relatively closely together, whereby the fishing line 23 will be clamped by the segments.

It will be readily apparent that when it is desired to adjust the position of the float along the fishing line, it is merely necessary to release the float by squeezing the opposite plungers 16 and 16', whereby the float may be moved to its desired position on the line and the plungers 16 and 16' may be thereafter released, leaving the float attached to the fishing line in the desired position thereof.

The float segments 13 and 13' may be made of any suitable material, such as plastic material, suitably molded to provide the desired hollow structure, and to provide the necessary buoyancy.

While a specific embodiment of an improved fishing float has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fishing float comprising a pair of mating substantially hemispherical, closed, hollow buoyant segments having substantially flat mating surfaces, respective plunger elements rotatably mounted in the segments and projecting outwardly therefrom at opposite sides of the float, a respective rod element axially secured to the outer portion of the plunger element of each segment, each rod element extending inwardly beyond the flat surface of its associated segment and being connected to the opposite segment, spring means in the plunger elements acting on the segments and resiliently biasing said segments to urge said mating surfaces together, and locking projections on said mating surfaces, said surfaces being formed with recesses receiving said projections, said segments being at times rotatable to positions wherein the projections engage the flat portions of the surfaces, whereby the segments are spaced apart sufficiently to allow a fishing line to run freely therethrough, the line being clamped by the segments when the projections are engaged in said recesses.

2. A fishing float comprising a pair of mating substantially hemispherical, closed, hollow buoyant segments having substantially flat mating surfaces, respective plunger elements rotatably mounted in the segments and projecting outwardly therefrom at opposite sides of the float on an axis perpendicular to said mating surfaces, a respective rod element secured axially to the plunger element of each segment and extending substantially along said axis inwardly beyond the flat surface of the associated segment, means rigidly securing the inner end of the rod element of each plunger element to the opposite segment, spring means in the plunger elements acting on the segments and resiliently biasing said segments to urge said mating surfaces together, and locking projections on said mating surfaces, said surfaces being formed with recesses receiving said projections, said segments being at times rotatable to positions wherein the projections engage the flat portions of the surfaces, whereby the segments are spaced apart sufficiently to allow a fishing line to run freely therethrough, the line being clamped by the segments when the projections are engaged in said recesses.

References Cited in the file of this patent
UNITED STATES PATENTS

| 418,995 | Tufts | Jan. 7, 1890 |
| 2,601,736 | Fisher | July 1, 1952 |
| 2,670,560 | Matras | Mar. 2, 1954 |